(12) United States Patent
Miebach et al.

(10) Patent No.: US 11,320,047 B2
(45) Date of Patent: May 3, 2022

(54) TRANSMISSION ASSEMBLY WITH A PARKING LOCK

(71) Applicant: GKN Automotive Limited, Birmingham (GB)

(72) Inventors: Sascha Miebach, Neunkirchen-Seelscheid (DE); Mark Schmidt, Königswinter (DE); Ervin Szilagyi, Neunkirchen-Seelscheid (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/256,260

(22) PCT Filed: Jun. 29, 2018

(86) PCT No.: PCT/EP2018/067720
§ 371 (c)(1),
(2) Date: Dec. 28, 2020

(87) PCT Pub. No.: WO2020/001794
PCT Pub. Date: Jan. 2, 2020

(65) Prior Publication Data
US 2021/0231213 A1 Jul. 29, 2021

(51) Int. Cl.
*F16H 63/34* (2006.01)
*B60K 1/00* (2006.01)
(Continued)

(52) U.S. Cl.
CPC ........... *F16H 63/3425* (2013.01); *B60K 1/00* (2013.01); *B60K 17/04* (2013.01); *B60T 1/005* (2013.01);
(Continued)

(58) Field of Classification Search
None
See application file for complete search history.

(56) References Cited

FOREIGN PATENT DOCUMENTS

| DE | 4244685 A1 | 1/1994 |
|---|---|---|
| DE | 202010001318 U1 | 5/2011 |

(Continued)

OTHER PUBLICATIONS

International Search Report and Written Opinion for PCT/EP2018/067720 dated Mar. 4, 2019 (14 pages; with English translation).

*Primary Examiner* — Dirk Wright
(74) *Attorney, Agent, or Firm* — Bejin Bieneman PLC

(57) ABSTRACT

A transmission assembly for an electric drive comprises a drive shaft, a reduction gearing rotatably drivable by the drive shaft, a power distribution unit drivingly connected to the reduction gearing and configured to transmit a rotational motion to two output parts, a parking lock unit having a parking ratchet wheel which is connected in a rotationally fixed manner to a torque-transmitting member in the power path between the drive shaft and the output parts, and having a controllable locking element which can be selectively engaged with the parking ratchet wheel; wherein the parking lock unit is arranged in a parking lock housing which is liquid-tightly sealed with respect to a transmission housing so that a first oil bath in the transmission housing is separated from a second oil bath in the parking lock housing.

15 Claims, 9 Drawing Sheets

(51) Int. Cl.
*B60K 17/04* (2006.01)
*B60T 1/00* (2006.01)
*F16H 37/08* (2006.01)
*F16H 57/02* (2012.01)
*F16H 57/027* (2012.01)
*F16H 57/037* (2012.01)
*F16H 57/04* (2010.01)

(52) U.S. Cl.
CPC ......... *F16H 37/0813* (2013.01); *F16H 57/02* (2013.01); *F16H 57/027* (2013.01); *F16H 57/037* (2013.01); *F16H 57/045* (2013.01); *F16H 57/0457* (2013.01); *F16H 57/0467* (2013.01); *B60K 2001/001* (2013.01); *F16H 57/0476* (2013.01); *F16H 57/0483* (2013.01); *F16H 2057/02034* (2013.01); *F16H 2057/02052* (2013.01); *F16H 2702/02* (2013.01)

(56) References Cited

FOREIGN PATENT DOCUMENTS

| | | | |
|---|---|---|---|
| DE | 102010039447 A1 * | 2/2012 | |
| EP | 2627529 A2 | 8/2013 | |
| WO | 2018001476 A1 | 1/2018 | |

* cited by examiner

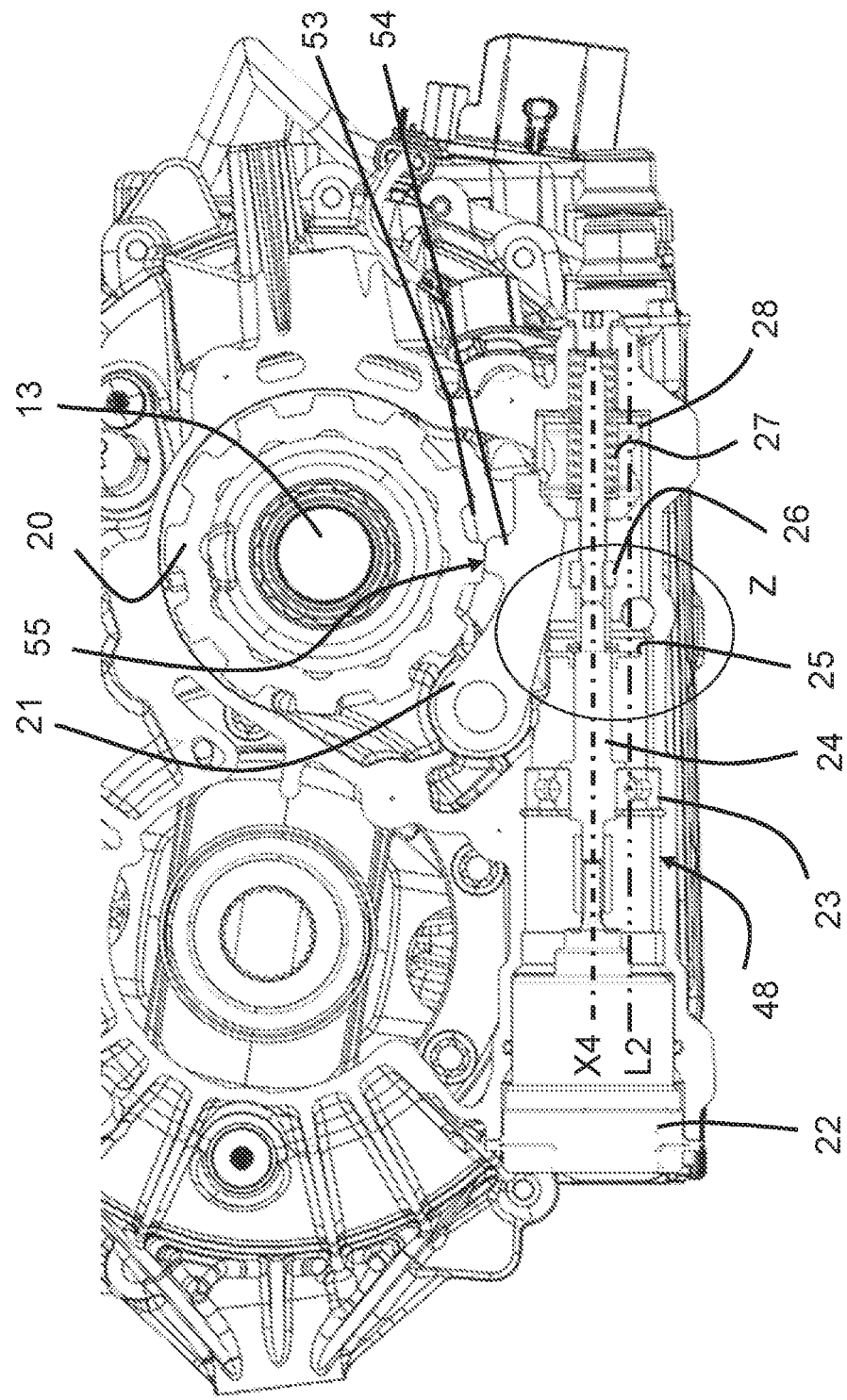

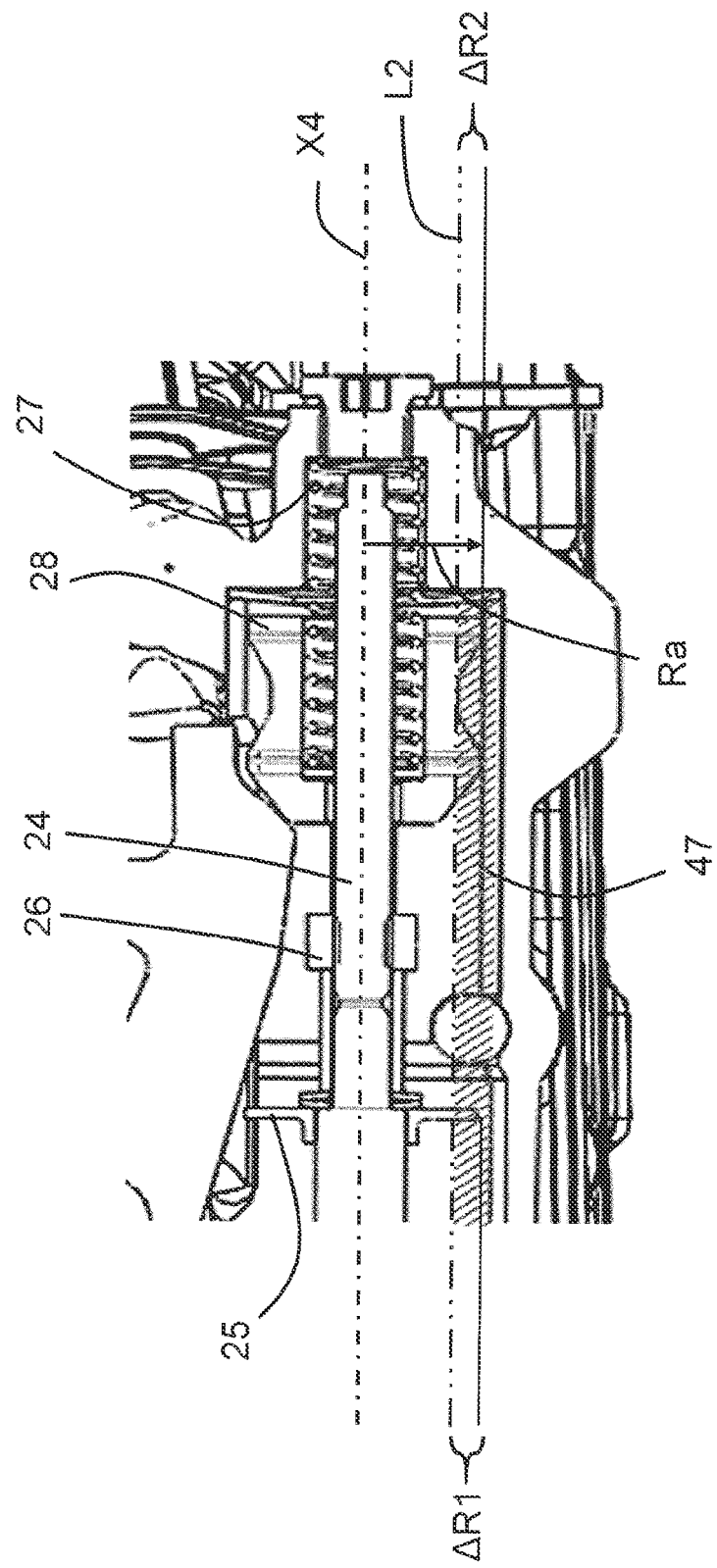

TRANSMISSION ASSEMBLY WITH A PARKING LOCK

CROSS-REFERENCE TO RELATED APPLICATIONS

This application is a national stage of, and claims priority to, Patent Cooperation Treaty Application No. PCT/EP2018/067720, filed on Jun. 29, 2018, which application is hereby incorporated herein by reference in its entirety.

BACKGROUND

From WO 2018/001476 A1 an electric drive assembly with a parking lock is known, which has an electric machine, a reduction gearing and a differential gearing, which are accommodated in a housing assembly. The reduction gearing consists of a spur gear unit and a downstream planetary gear unit, whose planet carrier is connected to a differential housing of the differential gearing in a rotationally fixed manner. The spur gear unit has a drive pinion on a motor shaft which is rotatably drivable by the electric machine and is in engagement with a drive gear. The drive gear is connected in a rotationally fixed manner to a gear shaft, which also comprises the sun gear of the planetary stage. The motor shaft has a free, projecting shaft end which extends into a parking lock housing and to which a ratchet wheel is connected in a rotationally fixed manner. The parking lock housing together with the housing assembly forms a common space in which the gear elements are accommodated.

SUMMARY

The present disclosure relates to a transmission assembly with a parking lock, e.g., for an electric drive of a motor vehicle. An electric drive can be provided as the sole drive for a motor vehicle. Alternatively, in hybrid drive concepts, a combustion engine can be provided in addition to the electric drive. The electric drive and the internal combustion engine can then either drive the vehicle alone, or together drive the vehicle in a joint manner. The electric machine of the electric drive is usually operated at high speeds. The transmission assembly of the electric drive takes over the function of speed adjustment between the high speeds of the electric machine and the usually slower speeds of the wheels. In addition, the transmission assembly compensates the speed of the individual wheels.

The present transmission assembly is provided with a parking lock that enables constant engagement speeds of the parking lock and is durable and easy to service.

Accordingly, a transmission assembly for an electric drive of a motor vehicle comprises: a drive shaft, a reduction gearing which is rotatably drivable by the drive shaft and is configured to transmit a rotational movement from high speed to a reduced speed, a power distribution unit which is drivingly connected to the reduction gearing and is configured to transmit an introduced rotary motion to two output parts, a parking lock unit with a parking ratchet wheel connected in a rotationally fixed manner to a torque-transmitting member in the power path between the drive shaft and the output parts, and with a controllable locking element which can be selectively engaged with the parking ratchet wheel; wherein the parking lock unit is arranged in a parking lock housing which is fluid-tightly sealed with respect to a transmission housing in which at least parts of the reduction gearing and the power distribution unit are arranged, so that a first oil bath in the transmission housing is separated from a second oil bath in the parking lock housing.

An advantage of the transmission assembly disclosed herein is that the parking ratchet wheel and the locking element can be lubricated by a second, separate oil bath. This allows a defined oil supply to the contact area between the parking ratchet wheel and the locking element when the parking lock is engaged, so that the engagement speed can be kept approximately constant over wide operating ranges of the transmission assembly. In addition, an oil type can be used for the second oil bath which is different to the oil type of the first oil bath and whose specification is adapted to the requirements of the lubrication between the parking ratchet wheel and the locking element. Moreover, the abrasion that is removed by the parking ratchet wheel and the locking element when the parking ratchet wheel is engaged, especially during ratcheting, is collected in the second oil bath and therefore does not contaminate the oil of the first oil bath, thus increasing the life of the elements of the reduction gearing and power distribution unit that are supplied with oil from the first oil bath. Furthermore, the arrangement of the parking lock in a separate parking lock housing enables, in the event of high wear, that the oil of the second oil bath as well as the parking ratchet wheel and the locking element can be specifically replaced during servicing.

The liquid-tight seal between the parking lock housing and the transmission housing can be achieved by arrangement of any suitable sealing element between the two housings. The sealing element can, for example, be configured as a rotary seal, such as a rotary shaft seal, or as a non-contact seal, such as a labyrinth seal.

It will be understood that in a transmission assembly disclosed herein only those elements of the parking lock unit need to be arranged in the parking lock housing through which the locking effect is provided on the torque-transmitting member in the power path between the drive shaft and the output parts, in particular the parking ratchet wheel and the locking element. Further elements of the parking lock unit, which are to be assigned to the actuator or the bearing of the locking element, for example, can be arranged either inside or outside the parking lock housing.

The torque-transmitting member in the power path between the drive shaft and the output parts can, for example, be the drive shaft, a gear shaft or a housing of the power distribution unit, without being limited thereto.

A power distribution unit may be understood as any arrangement that allows the power of at least one input element to be distributed to at least two output shafts and, in particular, that allows speed compensation between the output shafts. The power distribution unit can be designed as a differential gearing or as a double friction clutch unit.

In a possible embodiment, the locking element is controllable by a spindle drive, wherein the spindle drive includes a spindle shaft with a centrifugal disc rotatably supported about an axis of rotation, wherein the centrifugal disc conveys oil of the second oil bath towards a contact area of the parking ratchet wheel and the locking element when the spindle shaft rotates. This makes it possible to supply oil from the second oil bath specifically to the contact area of the parking ratchet wheel and the locking element while the locking element engages into the parking ratchet wheel. For this, the spindle drive can comprise an electric motor with which the spindle shaft is drivable in both directions of rotation. By rotating the spindle shaft, a control cone can be moved axially in one direction via a spindle nut, and in the opposite direction by a return spring. The control cone can have a guide contour on its surface by which, depending on the point of contact with the control cone, the locking element is either pushed towards the parking ratchet wheel or removed therefrom. By rotating the spindle shaft for actuating the locking element the centrifugal disc immersed in the second oil bath is also made to rotate. Friction and the resulting centrifugal force cause oil to be thrown radially outwardly and fed to the contact area of the parking ratchet wheel and the locking element.

In a possible embodiment, the centrifugal disc may have at least one throwing portion which is arranged at a throwing angle relative to the axis of rotation of the spindle shaft, wherein the throwing angle is less than or equal to 90° and/or greater than 25°, in particular greater than 45°. In this way, the oil thrown radially outwards by the centrifugal force can be conveyed in a direction, for example directly into the contact area of the parking ratchet wheel and the locking element. By selecting a throwing angle of less than 90°, it is thus possible to supply oil to areas that are not directly above the centrifugal disc. In particular, the centrifugal disc can be arranged laterally offset to the area to which the oil is to be supplied, which leads to increased flexibility in the design of the installation space of the transmission assembly. The centrifugal disc can also comprise several throwing portions with different throwing angles, so that several areas can be supplied with oil in a targeted manner. For example, the centrifugal disc may have one or more first throwing portions with a throwing angle of 90° and one or more second throwing portions with an exemplary throwing angle of 75°. Through the first throwing portions the oil is conveyed straight outwards in a radial direction and can, for example, supply the respective recess of the parking ratchet wheel, which just enters the contact region of the parking ratchet wheel and the locking element, with oil, while through the second portions the oil is conveyed in an inclined direction radially outwardly and, for example, the contact area of the parking ratchet wheel and the locking element is directly supplied with oil. In a possible embodiment, the centrifugal disc can be arranged in axial overlap with the parking ratchet wheel with respect to the rotational axis of the spindle shaft. In this way it can be ensured that the oil which is directly supplied radially outwardly reaches the contact area of the parking ratchet wheel and the locking element at least via the parking ratchet wheel.

In an installed state of the transmission assembly in a steady condition, according to a possible embodiment a level of the first oil bath may differ from a level of the second oil bath. In this way, a space-optimized arrangement of the transmission housing and the parking lock housing can be achieved. If required, due to the available installation space, it is also conceivable that the level of the first oil bath and the level of the second oil bath have the same nominal level.

In another embodiment, a level of the second oil bath in an installed state of the transmission assembly in a calmed condition can be vertically below an effective range of the parking ratchet wheel. The effective range shall be understood as the volume covered by the parking ratchet wheel after a complete rotation around the axis of rotation. This prevents the parking ratchet wheel from splashing in the second oil bath. This increases the efficiency of the transmission assembly, while at the same time the contact area of the parking ratchet wheel and the locking element can be supplied with a defined amount of oil, which is independent of the speed of the torque transmitting element in the power path between the input shaft and the output parts, to which the parking ratchet wheel is connected in a rotationally fixed manner.

In another embodiment, a level of the second oil bath in an installed state of the transmission assembly in a calmed condition can be vertically below the axis of rotation of the spindle shaft. This reduces splashing losses during rotation of the spindle shaft in the second oil bath and makes it easier to control the rotation of the spindle shaft. In a further embodiment, the spindle drive can have a control cone by which the locking element is movable from a release position, in which the parking ratchet wheel can rotate freely relative to the locking element, to a locking position, in which a rotation of the parking ratchet wheel about the longitudinal axis is locked by the locking element, wherein the control cone is immersed in the second oil bath in an installation state of the transmission assembly in a calmed condition at most with two thirds of a largest outer radius of the control cone, in particular at most with one third of a largest outer radius of the control cone. In this embodiment, the control cone has to be axially moved against only a part of the inertia of the oil in the second oil bath, so that faster engagement and disengagement of the parking lock is possible. In particular, the level of the second oil bath can also be selected such that a spindle bearing of the spindle drive is at least partially immersed in the second oil bath.

In a further embodiment, the parking ratchet wheel can be connected in a rotationally fixed manner to a free shaft end of the torque-transmitting element in the power path between the drive shaft and the output parts. The free shaft end shall be understood as any part of the torque transmitting member in the power path between the drive shaft and the output parts that protrudes or cantilevers over a bearing arrangement. This ensures that a housing element of the parking lock housing can be dismounted independently of any disassembly of the torque transmitting member in the power path between the drive shaft and the output parts. This increases the accessibility of the parking lock in case of service. However, it is also conceivable that the torque-transmitting member in the power path between the drive shaft and the output parts is rotatably supported in the housing element of the parking lock housing and the parking lock wheel is arranged between the bearing elements of the associated bearing arrangement.

According to a possible embodiment, the transmission housing can comprise at least a first housing part and a second housing part and can enclose a transmission chamber in which the reduction gearing and the power distribution unit are at least partially arranged, and the parking lock housing can be formed at least by the second housing part and a third housing part and can enclose a parking lock chamber in which the parking lock unit is at least partially arranged. In a further embodiment, the transmission chamber and the parking lock chamber may be connected by a pressure balance passage, wherein a first inlet of the pressure balance passage is arranged in the transmission chamber and a second inlet of the pressure balance passage is arranged in the parking lock chamber. If there are high pressure differences in the two chambers, the sealing effect of a sealing element arranged between the transmission housing and the parking lock housing may fail at least for a short time, so that the oil of the first oil bath becomes contaminated with the oil of the second oil bath or vice versa. The pressure balance passage ensures that the pressures in the transmission chamber and the parking lock chamber are substantially identical, so that the sealing element can reliably separate the two chambers from each other.

To prevent the oil of the first oil bath from being contaminated with the oil of the second oil bath via the pressure balance passage, the first inlet can be located above the second inlet. In this case, the oil of the second oil bath would have to rise up the pressure balance passage against gravity. This can be largely excluded by choosing a sufficient length, rising height and a sufficiently large diameter of the pressure balance passage.

To prevent the oil of the second oil bath from being contaminated with the oil of the first oil bath via the pressure balance passage, a splash-free labyrinth chamber can be arranged adjacent to the first inlet of the pressure balance passage. This prevents splash oil from the first oil bath from entering the area of the first inlet and being conveyed by gravity through the pressure balance passage into the second oil bath.

The labyrinth space can have at least one orifice portion and at least one collecting portion. An orifice portion is a constriction of the labyrinth space, which can be located at the entrance of the labyrinth space. The collecting portion of the labyrinth chamber catch splash oil that has entered through an orifice portion and return it to the oil bath. In particular, the collecting portions are designed such that they do not have any depressions in which splash oil can accumulate permanently. The labyrinth chamber can be formed at least partially by the second housing element and/or the first housing element. The labyrinth chamber may be integrated, in particular cast in one of the first housing element and the second housing element.

At least one of the transmission housing and the parking lock housing may contain a venting element through which the transmission chamber and/or the parking lock chamber can be vented to the environment.

An electric drive with a transmission assembly in accordance with this disclosure offers the same advantages as described above in connection with the transmission assembly, which is referred to as an abbreviation.

BRIEF SUMMARY OF THE DRAWINGS

Exemplary embodiments are explained below using the drawing figures, which show:

FIG. 6: a portion of a cross-section of the electric drive of FIG. 3 along the sectional line III-Ill;

FIG. 7: an enlarged portion of FIG. 6 in the area between the centrifugal disc and the control cone;

DESCRIPTION WITH REFERENCE TO THE DRAWINGS

Figure 1:
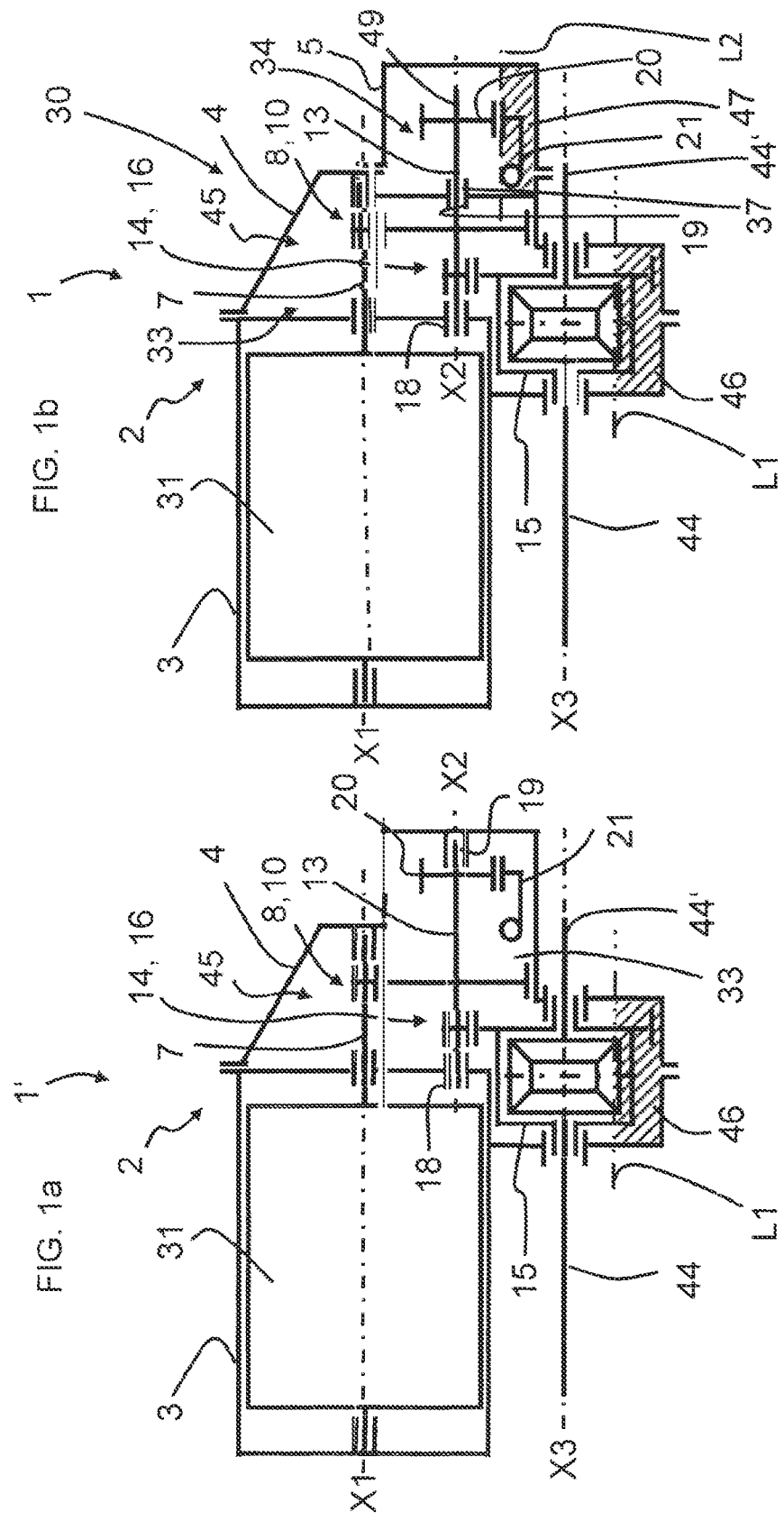
FIG. 1a: schematically an electric drive with a transmission assembly described for background understanding.
FIG. 1b: schematically an electric drive with a transmission assembly according to a first embodiment.
Figure 2:
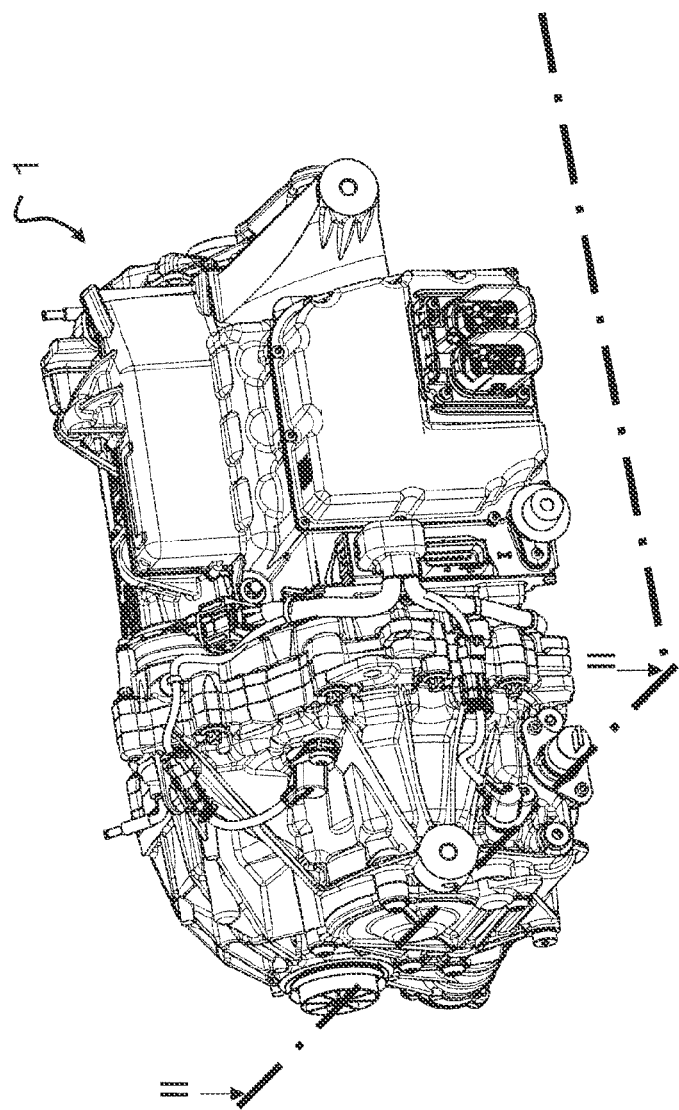
FIG. 2: an electric drive with an transmission assembly according to a second embodiment in a perspective view.
Figure 3:
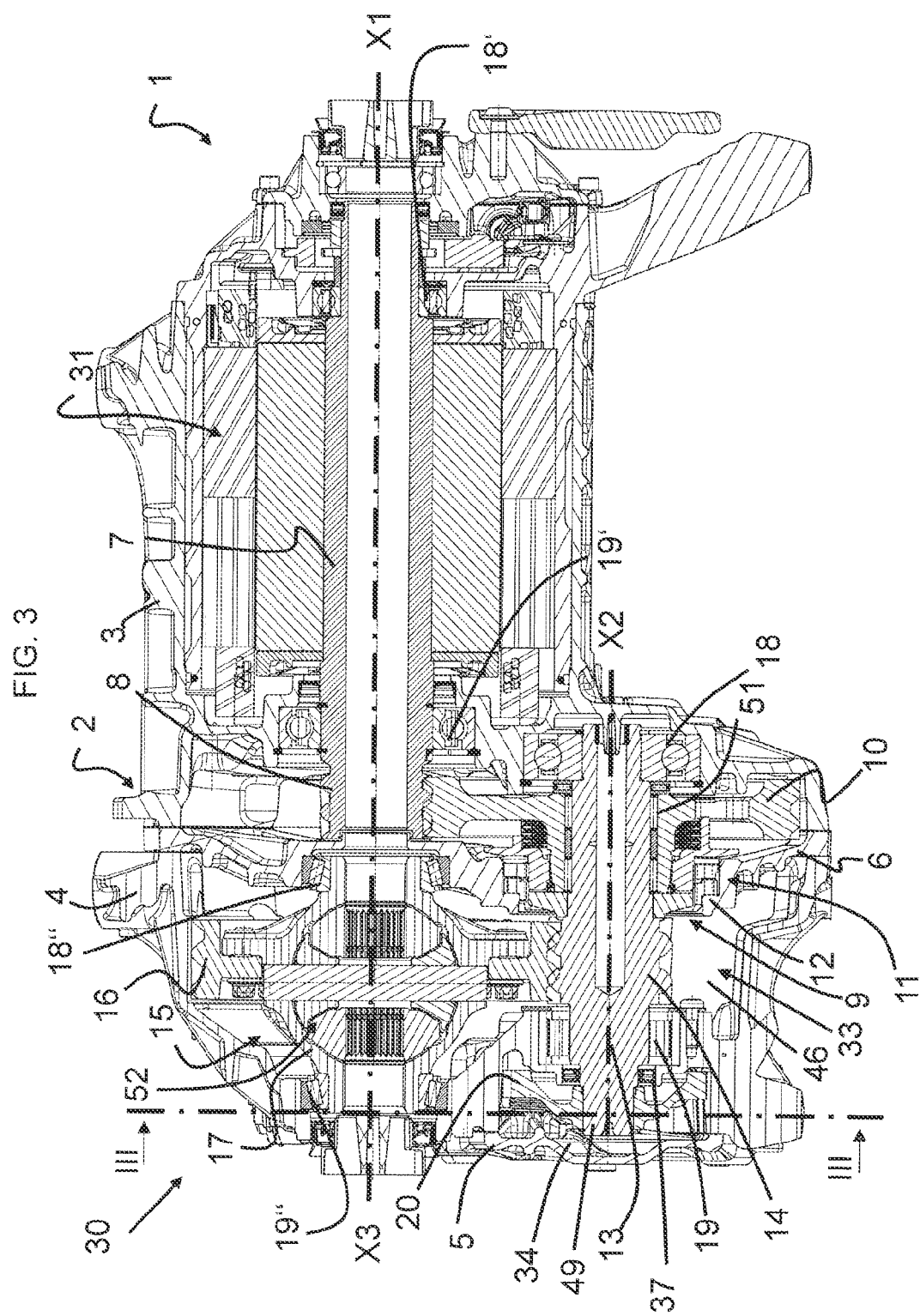
FIG. 3: the electric drive from FIG. 2 in a sectional view along sectional plane II-II.
Figure 5:
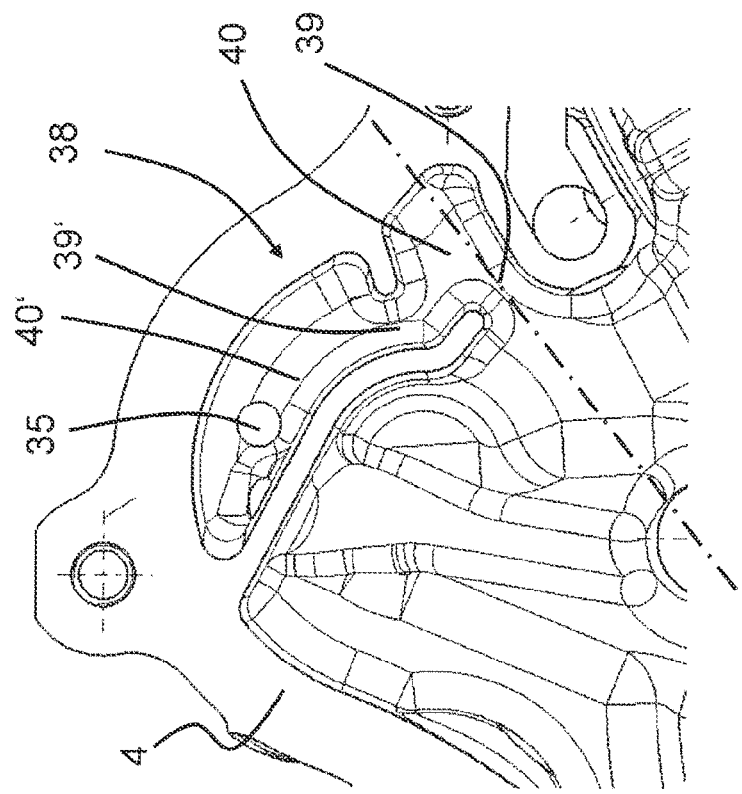
FIG. 5: a portion of the side view from the right of the second housing part of the electric drive of FIG. 4.
Figure 4:
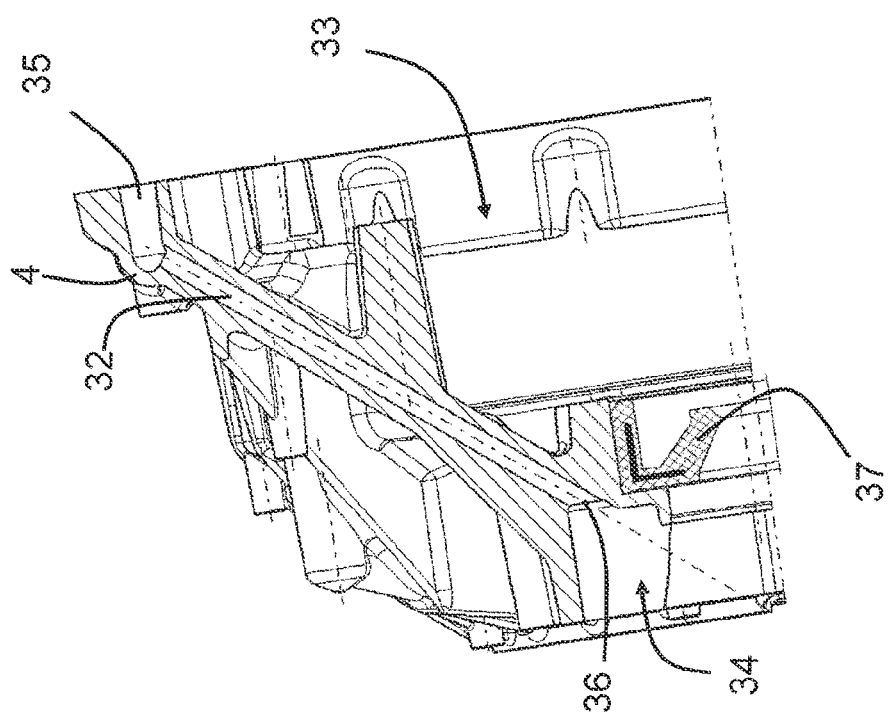
FIG. 4: is a portion of a longitudinal section through the second housing part of the electric drive of FIG. 2.

FIG. 1a shows an electric drive 1', wherein a housing assembly 2 comprising a first housing element 3 and a second housing element 4 which enclose a transmission chamber 33 in which a reduction gearing 45 and a differential assembly 15 are drivingly connected with each other. The reduction gearing 45 comprises a motor shaft 7 rotatably drivable about an axis of rotation X1 by an electric machine 31, with a drive pinion 8 which meshes with a mating gear 10. The mating gear 10 is rotationally fixedly mounted on an intermediate shaft 13, which is rotatably supported by a bearing 18 in the first housing element 3 and a bearing 19 in the second housing element 4. A parking wheel 20 is also connected to the intermediate shaft 13 in a rotationally fixed manner. Its degree of rotational freedom about a rotation axis X2 can be tied up by engaging a parking pawl 21, thus locking the electric drive. A drive pinion 14 of the intermediate shaft 13 is in engagement with a ring gear 16 which is firmly connected to a differential housing 17 of the differential arrangement 15. The ring gear 16 is immersed in a first oil bath 46 which is contained in the transmission chamber 33 and has a level L1. As the ring gear 16 rotates, the oil from the first oil bath 46 is distributed in the transmission chamber 33, lubricating, among other things, the parking wheel 20 and the parking pawl 21. Depending on the speed of the ring gear 16, more or less oil reaches the contact area between the parking wheel 20 and the parking pawl 21. On the one hand, this may lead to a minimum lubrication in slow operating conditions, on the other hand, the inconstant lubrication of the contact area between parking wheel 20 and parking pawl 21 leads to a variability of the critical engagement speed at which the parking pawl 21 is no longer repelled by parking wheel 20 and a tooth of the parking pawl 21 engages in a recess of parking wheel 20.

In contrast, FIG. 1b schematically shows a transmission assembly 30, respectively an electric drive 1, in a first embodiment. It differs from the electric drive 1 respectively the transmission of FIG. 1a by the arrangement of the parking wheel 20 and the parking pawl 21 in a parking lock chamber 34. For similarities, reference shall thus be made to the description of FIG. 1a, where identical and/or corresponding elements have been marked with the same reference signs.

In the transmission assembly 30 and/or electric drive 1, the intermediate shaft 13 passes through a wall of the second housing element 4 and comprises a free, projecting shaft end 49 adjacent to the bearing 19. The free shaft end 49 extends into a parking lock chamber 34, which is enclosed by the second housing element 4 and a third housing element 5, which can also be configured as a housing cover. On the free shaft end 49 the parking wheel 20 is arranged in a rotationally fixed manner, which can be selectively engaged with a parking pawl 21 also arranged in the parking lock chamber 34.

The parking lock chamber 34 is sealed from the transmission chamber 33 by a sealing element 37, which in the present case is designed as a schematically illustrated labyrinth seal. However, any other sealing element is also conceivable, for example a rotary seal or other contactless seal. A second oil bath 47 with a level L2 is received in the parking lock chamber 34. The level L2 of the second oil bath 47 is vertically above the level L1 of the first oil bath 46. Depending on the installation space requirements for the electric drive, it is also conceivable that the level L2 of the second oil bath 47 is vertically below the level L1 of the first oil bath 46 or that the two levels L1, L2 have a common nominal level. By separating the first oil bath 46 from the second oil bath 47, the level L2 and the oil grade of the second oil bath 47 can be specifically adapted to the requirements of the parking locks.

FIGS. 2 to 7, which are described together below, show a transmission assembly 30 and, respectively, an electric drive 1 with such a transmission in a second embodiment.

An electric machine 31 is accommodated in a first housing element 3 of a housing arrangement 2 and comprises a motor shaft 7 which is rotatably drivable about an axis of rotation X1. The motor shaft 7 has a drive pinion 8 at one end of the shaft, which together with a toothed mating gear 10 forms a first gear stage. The mating gear 10 is rotatably supported on the intermediate shaft 13 by a bearing 51, for example a needle bearing, and can be selectively connected therewith for transmitting torque or disconnected therefrom via a clutch assembly 11, which is axially supported in a clutch seat 12 of the intermediate plate 6. The intermediate shaft 13 also includes a drive pinion 14, which is integrated in the shaft body of the intermediate shaft 13 and, together with a ring gear 16, forms a second gear stage. The ring gear 16 is firmly connected to a differential housing 17 of a differential arrangement 15. The differential arrangement 15 also includes a differential gear set 52, which is arranged inside the differential housing 17 and to which output shafts not shown can be connected.

The transmission assembly comprising the drive pinion 8, the mating gear 10, the clutch assembly 11, the intermediate shaft 13, the ring gear 16 and the differential assembly 15 is arranged in a transmission chamber 33, which is formed by the first housing element 3, an intermediate plate 6 and a second housing element 4. The first gear stage 8, 10 and the second gear stage 14, 16 are arranged on different sides of the intermediate plate 6.

The intermediate shaft 13 is supported by a first bearing 18, which is accommodated in the first housing element 3, and by a second bearing 19, which is accommodated in the second housing element 4 so as to be rotatable about the axis of rotation X2. The axis of rotation X2 is offset parallel to the axis of rotation X1 of the motor shaft 7 by the amount of the axis distance of the first gear stage. The intermediate shaft 13 extends through an opening 9 of the intermediate plate 6.

The differential assembly 15 is supported by a first bearing 18″, which is accommodated in the intermediate plate 6, and a second bearing 19″, which is accommodated in the second housing element 4 so as to be rotatable about an axis of rotation X3. The axis of rotation X3 is arranged coaxially to the axis of rotation X1 of the motor shaft 7.

The transmission chamber 33 is divided by the intermediate plate 6 into two sections, which are connected to each other via the opening 9 in the area of the clutch assembly 11, wherein the first gear stage 8, 10 is located in the first section and the second gear stage 14, 16 in the second section. A first oil bath 46 with a first level is received in the transmission chamber 33, extending into the two sections. It is also conceivable that a sealing element could be arranged in the opening 9 of the intermediate plate 6 so that the two sections are separated from each other. In this way, a separate oil bath could be provided in each of the two sections, the level and/or type of oil of which is adapted to the respective gear stage.

The intermediate shaft 13 has a free, cantilevered shaft end 49 adjacent to the bearing 19, which projects into a parking lock chamber 34. The parking lock chamber 34 is enclosed by the second housing element 4 and a third housing element 5, which is configured as a housing cover. A second oil bath 47 with a level L2 is received in the parking lock chamber 34. A sealing element 37, e.g. a radial shaft seal, seals the parking lock chamber 34 against the transmission chamber 33. In order to ensure a reliable sealing effect of the sealing element 37, a pressure balance passage 32 is arranged in the second housing element 4, which has a first inlet 35 in the direction of the transmission chamber 33 and a second inlet 36 in the direction of the parking lock chamber 34. The pressure balance passage 32 can be used to compensate for pressure differences between the transmission chamber 33 and the parking lock chamber 34, which can cause oil to pass through the sealing element 37. To prevent oil from entering through the pressure balance passage 32, the first inlet 35 is located above the second inlet 36. This prevents oil from entering the transmission chamber 33 from the parking lock chamber 34. In addition, a labyrinth room 38 is arranged adjacent to the first inlet 35 and is formed by projections in the second housing element 4 and by the intermediate plate 6. The labyrinth room 38 comprises two orifice plate sections 39, 39′ and two collecting sections 40, 40′ which together prevent splash oil from the first oil bath 46 from entering the first inlet and return the splash oil to the first oil bath 46.

A parking pawl 21 is also arranged in the parking lock chamber 34, which can be reversibly transferred via a spindle drive 48 into a release position, in which the parking wheel 20 can rotate freely around the rotation axis X2, and into a locked position, in which the rotational freedom of the parking wheel 20 around the rotation axis X2 is tied and the electric drive is locked. In the locked position, a tooth 54 of the parking pawl 21 engages into a recess 53 of the parking wheel 20. The spindle drive 48 comprises a control cone 28, which has a guide contour. Depending on the contact point of the parking pawl 21 on the guide contour, the parking pawl 21 is pivoted into or out of the effective range of the parking wheel 20. The control cone 28 is arranged axially movable and can be pushed by a spindle nut 26 in one direction, in the embodiment shown here in the direction of a release position. For this purpose, the spindle nut 26 can be moved axially by rotating a spindle shaft 24 about the axis of rotation X4 by a servomotor 22. Starting from a release position, the spindle nut 26 can be moved in the direction of a locked position as shown in FIGS. 6 and 7. In doing so, the control cone 28 is made to follow the spindle nut 26 via a return spring 27. In the case of a tooth-on-tooth position or ratcheting, the control cone 28 will first remain in the release position and only pivots the tooth 54 of the parking pawl 21 into the effective range of the parking wheel 20 when the speed falls below the critical engagement speed. During ratcheting, the control cone 28 is repelled axially by the parking pawl 21 and performs an oscillating movement against the return spring 27.

If the control cone 28 is immersed in the second oil bath 47, the inertia of the oil acts like a damper on the oscillating movement and thus influences the critical engagement speed. To minimize the influence of the second oil bath 47 on the critical engagement speed and/or to keep it substantially constant, the level L2 of the second oil bath 47 can be selected such that the immersion depth ΔR2 of the control cone 28 is less than ⅔ of its outer radius Ra, in particular less than ⅓ of its outer radius Ra. In addition, the level L2 of the second oil bath 47 can be selected such that a bearing 23 for the rotating bearing of the spindle shaft 24 is immersed in the second oil bath 47.

Figure 9A:
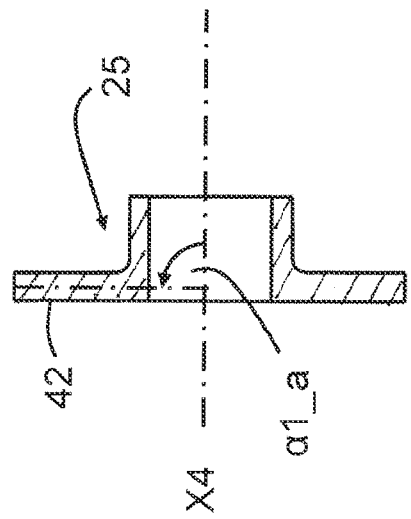
FIG. 9a: the centrifugal disc in the first embodiment in a longitudinal section along the section line VIIIa-VIIIa.
Figure 8A:
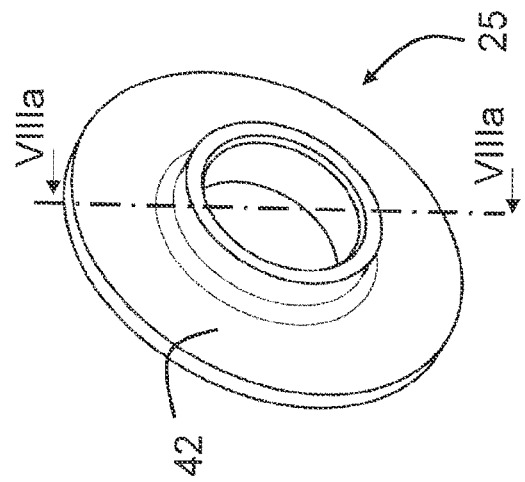
FIG. 8a: a centrifugal disc in a first embodiment.

A centrifugal disc 25 is firmly connected to the spindle shaft 24, which is immersed in the second oil bath 47 with an immersion depth ΔR1. When the spindle shaft 24 rotates to actuate the control cone 28, the centrifugal force causes oil from the second oil bath 47 to be thrown radially outwardly by the centrifugal disc 25 and the contact area 55 between the parking wheel 20 and the parking pawl 21 is supplied with oil. For this, with respect to the rotation axis X4, the centrifugal disc 25 can be positioned axially overlapping the parking wheel 20. The centrifugal disc 25 used in the second embodiment of the electric drivel is shown in FIG. 8a in a perspective view and in FIG. 9a in a longitudinal section. The centrifugal disc 25 has a rotating throwing portion 42, which is arranged at a throwing angle α1 a of 90° with respect to the axis of rotation X4. In this configuration the oil of the second oil bath 47 is thrown off mainly in a radial direction. As shown in FIG. 6, the centrifugal disc 25 supplies oil to the parking wheel 20, which subsequently carries the oil to the contact area 55 between parking wheel 20 and parking pawl 21.

Figure 9B:
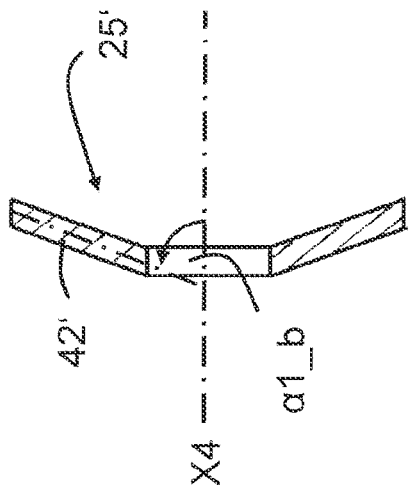
FIG. 9b: the centrifugal disc in the second embodiment in a longitudinal section along the section line VIIIb-VIIIb.
Figure 8B:
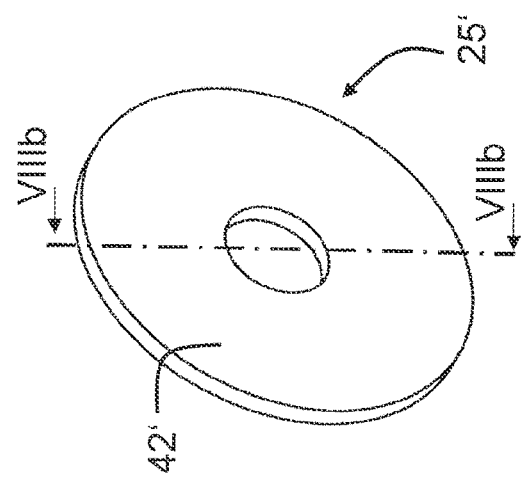
FIG. 8b: a centrifugal disc in a second embodiment.

FIGS. 8b and 9b show a second possible configuration of the centrifugal disc 25'. The centrifugal disc 25' has a rotating throwing portion 42', which is arranged at a throwing angle α1 b of e.g. approximately 70° with respect to the axis of rotation X4. With this configuration, the oil of the second oil bath 47 is thrown off in one direction with a radial and an axial component. In this way, an area axially offset from the centrifugal disc 25' can be supplied with oil in a targeted manner. In the case of the arrangement shown in FIG. 6, the centrifugal disc 25' could deliver oil directly into the contact area 55 between the parking wheel 20 and the parking pawl 21.

Figure 9C:
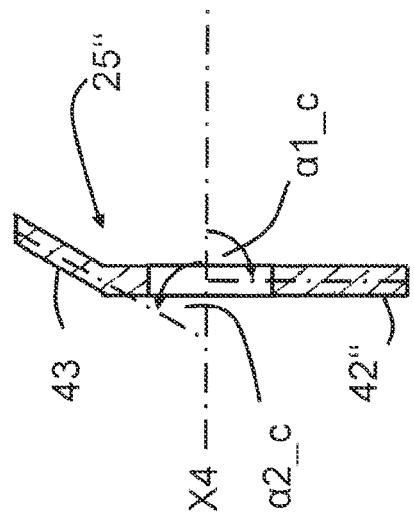
FIG. 9c: the centrifugal disc in the third embodiment in a longitudinal section along the section line VIIIc-VIIIc.
Figure 8C:
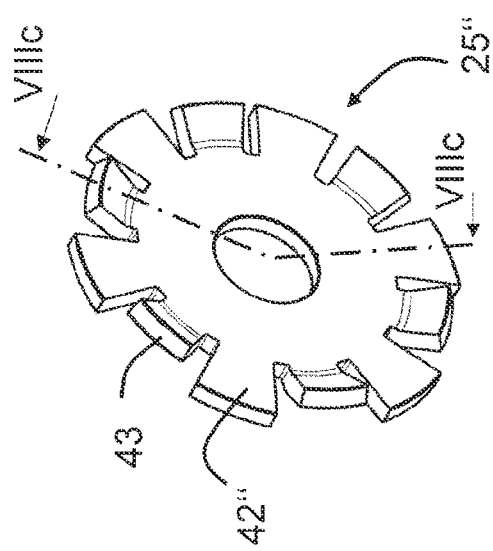
FIG. 8c: a centrifugal disc in a third embodiment.

FIGS. 8c and 9c show a third configuration of the 25" centrifugal disc. The centrifugal disc 25" has six first throwing portions 42", which are arranged at a throwing angle α1 c of 90° with respect to the axis of rotation X4 and which throw the oil of the second oil bath 47 mainly in radial direction. In addition, the centrifugal disc 25" has six second throwing portions 43, which are arranged at a discharge angle α2c of, for example, approximately 70° with respect to the axis of rotation X4 and which throw off the oil of the second oil bath 47 in a direction with a radial and an axial component. This third configuration of the centrifugal disc 25" allows several areas to be supplied with oil through the centrifugal disc 25". In the case of the arrangement shown in FIG. 6, the centrifugal disc 25" could both supply oil to the parking wheel 20, which subsequently carries the oil to the contact area 55 between the parking wheel 20 and the parking pawl 21, and also supply oil directly to the contact area 55 between the parking wheel 20 and the parking pawl 21.

LIST OF REFERENCE SIGNS

1; 1' electric drive
2 housing arrangement
3 housing element
4 housing element
5 housing element
6 intermediate plate
7 motor shaft
8 drive pinion
9 opening
10 mating gear
11 clutch arrangement
12 clutch seat
13 intermediate shaft
14 drive pinion
15 differential arrangement
16 ring gear
17 differential housing
18, 18', 18" bearing
19, 19', 19" bearing
20 parking wheel
21 parking pawl
22 servo motor
23 bearing
24 spindle shaft
25, 25', 25" centrifugal disc
26 spindle nut
27 return spring
28 control cone
29 sleeve
30 transmission assembly
31 electric machine
32 pressure balance passage
33 transmission chamber
34 parking lock chamber
35 inlet
36 inlet
37 sealing element
38 labyrinth room
39, 39' orifice section
40, 40' collecting section
42, 42', 42" throwing portion
43 throwing portion
44, 44' side shafts
45 reduction gearing
46 oil bath
47 oil bath
48 spindle drive
49 free shaft end
51 bearing
52 differential gear set
53 recess
54 tooth
Ra outer radius
ΔR1 immersion depth of centrifugal disc
ΔR2 immersion depth of control cone
L level
X axis of rotation
α throwing angle

The invention claimed is:

1. A transmission assembly for an electric drive of a motor vehicle, comprising:
   a drive shaft,
   a reduction gearing, which is rotatably drivable by the drive shaft and is configured to transmit a rotary motion introduced with high speed to a reduced speed,
   a power distribution unit drivingly connected to said reduction gearing and configured to transmit an introduced rotary motion to two output parts,
   a parking lock unit including a parking ratchet wheel which is connected in a rotationally fixed manner to a torque-transmitting member in the power path between the drive shaft and the output parts, and a controllable locking element which is selectively engageable with the parking ratchet wheel;
   wherein the parking lock unit is arranged in a parking lock housing which is liquid-tightly sealed with respect to a transmission housing in which at least parts of the reduction gearing and the power distribution unit are arranged, so that a first oil bath in the transmission housing is separated from a second oil bath in the parking lock housing.

2. The transmission assembly according to claim 1, wherein the locking element is controllable by a spindle drive, wherein the spindle drive comprises a spindle shaft with a centrifugal disc rotatably mounted about an axis of rotation, wherein the centrifugal disc upon rotation of the spindle shaft conveys oil of the second oil bath towards a contact area of the parking ratchet wheel and of the locking element.

3. The transmission assembly according to claim 2, wherein the centrifugal disc comprises at least one throwing portion which is arranged at a throwing angle relative to the axis of rotation of the spindle shaft, wherein the throwing angle is less than or equal to 90° and greater than 25°.

4. The transmission assembly according to claim 2, wherein the centrifugal disc is arranged with respect to the axis of rotation of the spindle shaft axially overlapping the parking ratchet wheel.

5. The transmission assembly according to claim 1, wherein, in a state of installation of the transmission assembly in a calmed condition, a level of the first oil bath differs from a level of the second oil bath.

6. The transmission assembly according to claim 1, wherein a level of the second oil bath in a state of installation of the transmission assembly in a calmed condition is vertically below an effective range of the parking ratchet wheel.

7. The transmission assembly according to claim 6, wherein a level of the second oil bath in a state of installation of the transmission assembly in a calmed condition lies in a vertical direction below the axis of rotation of the spindle shaft.

8. The transmission assembly according to claim 2, wherein the spindle drive comprises a control cone by which the locking element is reversibly movable from a release position, in which the parking ratchet wheel can rotate freely relative to the locking element, into a locking position, in which a rotation of the parking ratchet wheel about the longitudinal axis is locked by the locking element, and
wherein, in an installation position of the transmission assembly in a calmed condition, the control cone is immersed in the second oil bath at most with two thirds of a largest outer radius of the control cone.

9. The transmission assembly according to claim 1, wherein the parking ratchet wheel is connected in a rotationally fixed manner to a free shaft end of the torque-transmitting member in the power path between the drive shaft and the output parts.

10. The transmission assembly according to claim 1, wherein the transmission housing comprises at least a first housing part and a second housing part and encloses a transmission chamber in which the reduction gearing and the power distribution unit are at least partially arranged, and
wherein the parking lock housing is formed at least by the second housing part and a third housing part and encloses a parking lock chamber in which the parking lock unit is at least partially arranged.

11. The transmission assembly according to claim 10, wherein the transmission chamber and the parking lock chamber are connected by a pressure balance passage, wherein a first inlet of the pressure balance passage is arranged in the transmission chamber and a second inlet of the pressure balance passage is arranged in the parking lock chamber.

12. The transmission assembly according to claim 11, wherein the first inlet is arranged above the second inlet.

13. The transmission assembly according to claim 11, wherein a labyrinth room free of splash oil is arranged adjacent to the first inlet of the pressure balance passage.

14. The transmission assembly according to claim 10, wherein at least one of the transmission housing and the parking lock housing accommodates a venting element through which the respective one of the transmission chamber and the parking lock chamber can be vented to the environment.

15. An electric drive, comprising:
a transmission assembly including:
a drive shaft,
a reduction gearing, which is rotatably drivable by the drive shaft and is configured to transmit a rotary motion introduced with high speed to a reduced speed,
a power distribution unit drivingly connected to said reduction gearing and configured to transmit an introduced rotary motion to two output parts,
a parking lock unit including a parking ratchet wheel which is connected in a rotationally fixed manner to a torque-transmitting member in the power path between the drive shaft and the output parts, and a controllable locking element which is selectively engageable with the parking ratchet wheel,
wherein the parking lock unit is arranged in a parking lock housing which is liquid-tightly sealed with respect to a transmission housing in which at least parts of the reduction gearing and the power distribution unit are arranged, so that a first oil bath in the transmission housing is separated from a second oil bath in the parking lock housing; and
the electric drive further comprising a drive unit which is connected to the transmission housing, wherein the drive shaft of the transmission assembly is rotatably drivable by the drive unit.

* * * * *